United States Patent [19]
Mann

[11] Patent Number: 5,518,280
[45] Date of Patent: May 21, 1996

[54] SEAL FOR AN EXHAUST SYSTEM

[76] Inventor: Dennis L. Mann, 2239 N. Broad St., Colmar, Pa. 18915

[21] Appl. No.: 418,951

[22] Filed: Apr. 7, 1995

[51] Int. Cl.[6] .................................................. F16L 17/00
[52] U.S. Cl. .......................... 285/363; 285/379; 285/910
[58] Field of Search ........................ 285/334.2, 334.3, 285/363, 910, 349, 379; 277/235

[56] References Cited

U.S. PATENT DOCUMENTS

| | | | |
|---|---|---|---|
| 3,189,371 | 6/1965 | Swan | 285/334.3 X |
| 3,302,953 | 2/1967 | Glasgow | 285/363 X |
| 4,756,561 | 7/1988 | Kawata et al. | 285/910 X |
| 4,928,998 | 5/1990 | Brondener | 285/910 X |
| 5,174,615 | 12/1992 | Foster et al. | 285/334.2 |
| 5,228,726 | 7/1993 | Brown et al. | 285/334.2 X |
| 5,257,834 | 11/1993 | Zeidler et al. | 285/910 X |

FOREIGN PATENT DOCUMENTS

| | | | |
|---|---|---|---|
| 60578 | 11/1954 | France | 285/363 |
| 1533992 | 7/1968 | France | 285/363 |

*Primary Examiner*—Dave W. Arola

[57] ABSTRACT

A gasket for use with exhaust systems having at least one header flange and an exhaust pipe flange joined thereto. The gasket includes an inner annular sealing ring like member deformable under pressure mounted on an outer annular metal retainer ring sized to be mounted at a flange junction between said header flange and said exhaust pipe flange. The inner ring has an outside diameter slightly greater than the inside diameter of the inner ring to deformably support the inner ring on the outer ring. The outer ring inside diameter is greater than the inner diameter of the flange junction to permit the inner ring to be compressed upon forming the junction. The inner ring is formed from a non-asbestos fiber fused with spiral wound metal wire. It is preferred that the non-asbestos fiber is an aramid fiber and the spiral wound metal wire is stainless steel. The thickness of the inner ring is at least twice as thick as the thickness of the outer ring. It is also preferred that the inner ring has an inner diameter sufficiently large to avoid restricting flow of exhaust gas through the junction. For ease and permanence of mounting, the outer ring is provided with annularly spaced holes patterned to align with bolt holes on the flanges.

14 Claims, 2 Drawing Sheets

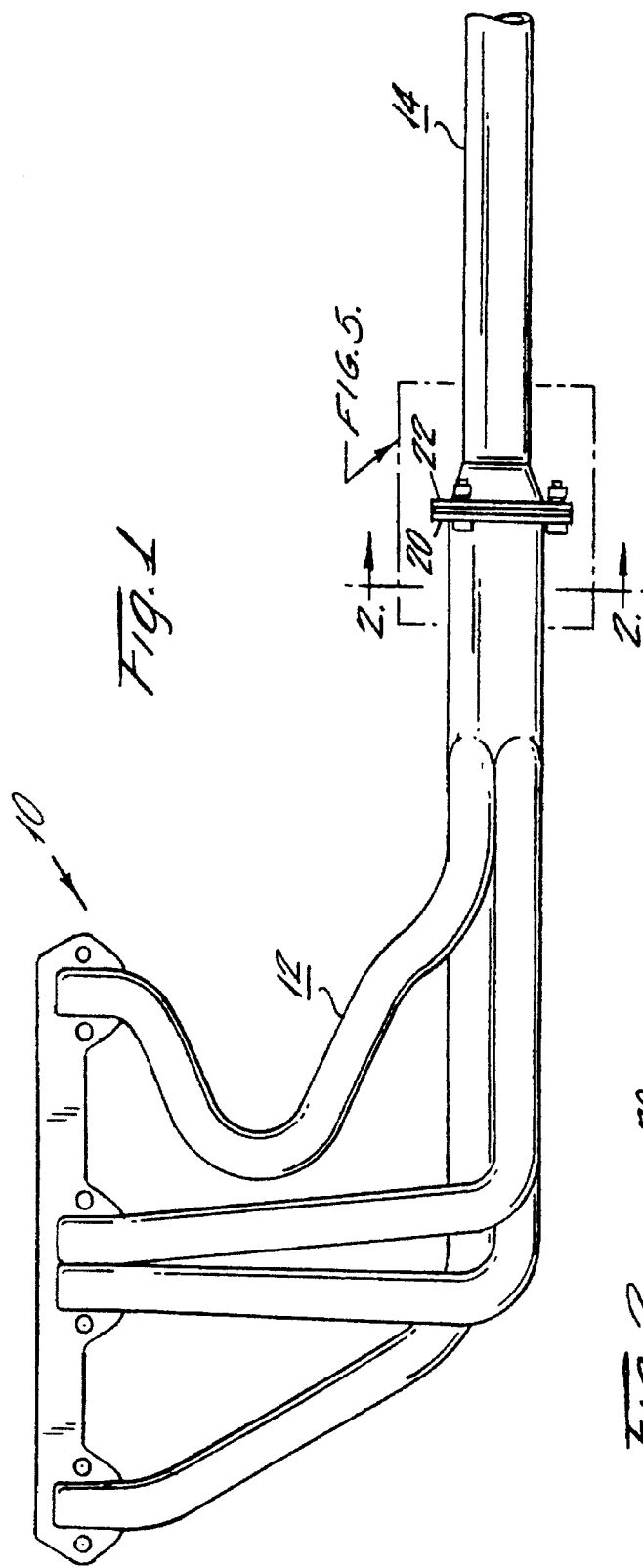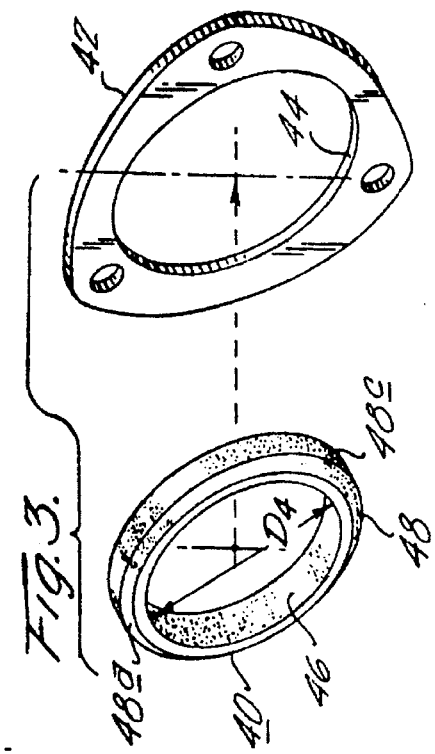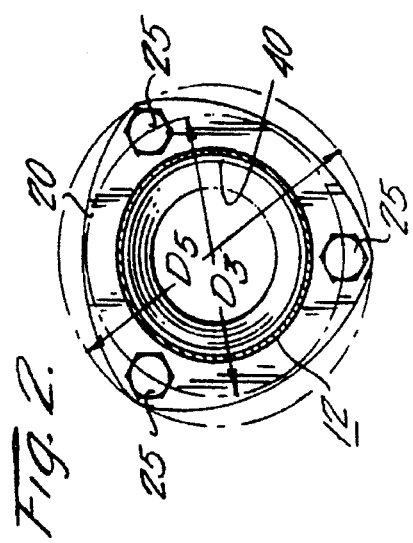

SEAL FOR AN EXHAUST SYSTEM

BACKGROUND OF THE INVENTION

A portion of a typical automotive exhaust system is shown schematically in FIG. 1 of the drawings. This system usually comprises a header which in some instances is made of steel to provide low back pressure, rapid acceleration and high fuel economy. The system has a stepped down tail pipe section which may include a catalytic converter and a muffler. The juncture of the header manifold and tail pipe section usually includes a flange connection which is secured by bolts which compress a gasket at the interface of the flanges.

A typical gasket materials is cork impregnated with asbestos. The confronting flange surfaces are rather narrow in a radial direction. By reason of this and also due to heat expansion and contraction in the exhaust systems, torsional shear forces are exerted on the gasket which produce cracking and associated exhaust leakage. Exhaust leakage in a passenger vehicle can be lethal. Furthermore, deterioration and failure of the gasket usually produces rattling and objectionable noise from the exhaust system. Most States now monitor exhaust systems and during periodic required inspections, will require replacement for leaky or noisy exhaust systems.

SUMMARY OF THE INVENTION

The present invention provides a seal particularly adapted for exhaust systems, which is characterized by novel features of construction and arrangement which overcomes the disadvantages of prior seals used for this purpose. The seal of the present invention provides a long lasting and secure means of sealing the junction between the header and exhaust pipe mating flange members.

To this end, the seal consists of an inner annular sealing ring-like member made of a deformable material, for example a non-asbestos materials such as polyamids and a metallic outer spacer or retainer ring preferably made of steel, disposed between the flanges of the header and exhaust pipe and which circumscribes the annular ring member. In the relaxed state, the inner annular ring member is preferably of a larger axial cross-section than the axial cross-section of the metallic outer retainer ring, such as, perhaps two or three times thicker. In the relaxed state, the largest outer diameter of the inner annular member is slightly smaller than the bore diameter of the outer retainer ring. Further, the outer peripheral surface of the annular member is preferably contoured and includes at least a portion of a greater diameter than the header opening at the junction of the exhaust manifold and tail pipe section. In this manner when the annular member and retainer ring are placed between the flanges and the exhaust manifold and tail pipe section flanges are pressed together by conventional bolts, the annular member is deformed in a radial direction to press tightly against the inner bore of the retainer ring and the contoured outer peripheral surface of the annular member overlies the axial portion of the junction between the manifold section and tail pipe adjacent the flanges. This provides a large surface contact with the annular member and the critical sealing area at the junction of the exhaust manifold and tail pipe section.

The installed seal of the present invention provides a large internal seal area that resists heat and pressure which develop in the exhaust system. Further, the internal back pressure acts on the seal in a manner to expand the sealing surfaces and aids in producing the large seal area, which inhibits escape of noxious exhaust gases and the like.

Further, the inner annular member is preferably made of a material which is capable of withstanding the temperature of the exhaust gases and is resistant to chemical deterioration to thereby preserve the integrity of the seal for a long period of time. As noted above, non-asbestos fibers such as polyamid fibers, manufactured by DuPont under the registered trademark Kevlar, are suitable materials for the inner ring. Similarly, the outer ring is formed of metal, preferably stainless steel in order to resist heat and corrosion.

BRIEF DESCRIPTION OF THE DRAWINGS

These and other objects of the present invention and the various features and details of the operation and construction thereof are hereinafter more fully set forth with reference to the accompanying drawings, wherein;

FIG. 1 is a schematic illustration showing some of the parts of a typical automotive exhaust system including a header section and a tail pipe section;

FIG. 2 is an enlarged sectional view taken on lines 2—2 of FIG. 1;

FIG. 3 is an exploded perspective view of the elements comprising a seal made in accordance with the present invention;

DETAILED DESCRIPTION OF THE PREFERRED EMBODIMENT

Figure 4:
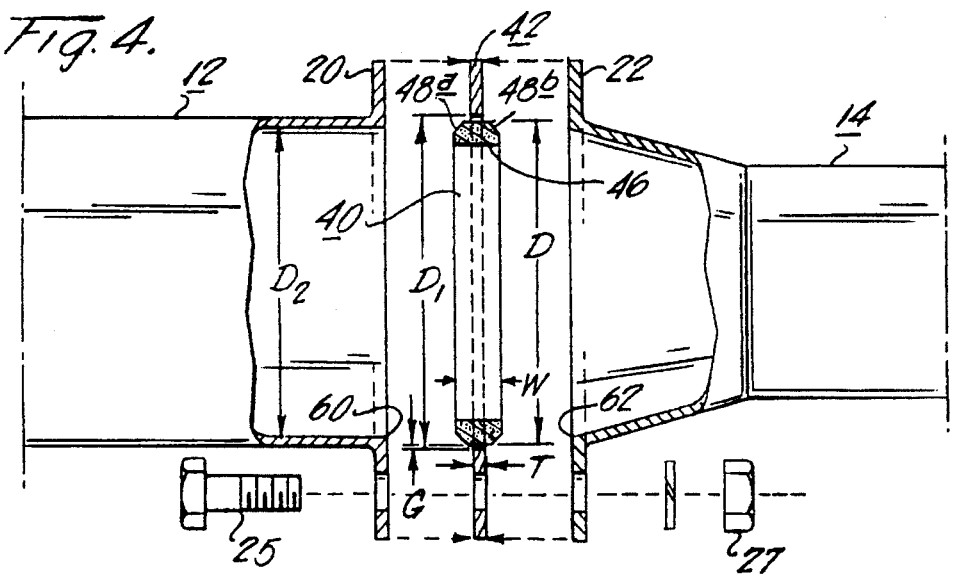
FIG. 4 is an exploded side elevational view partly in section showing the parts of the seal and manifold and tail pipe section prior to assembly of the seal.
Figure 5:
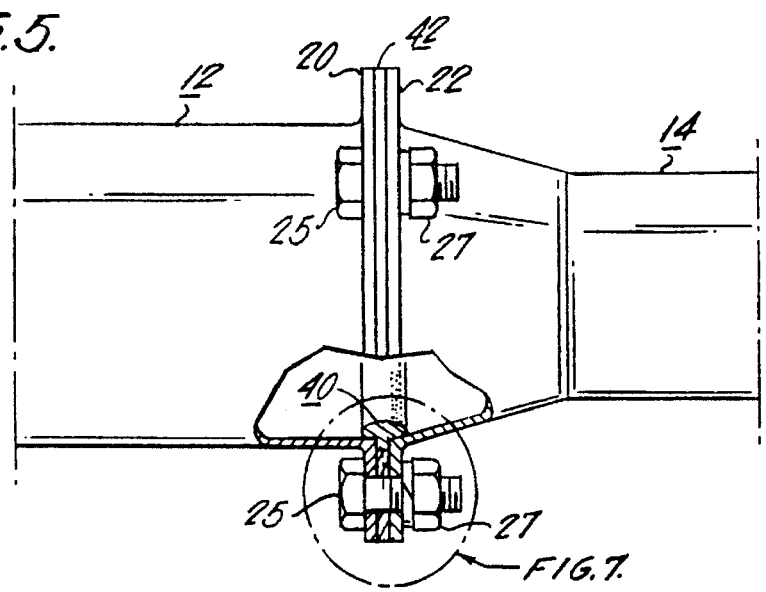
FIG. 5 is a side elevational view partly in section showing the seal in an assembled condition, the dot and dash portion shown in FIG. 1.

Referring now to the drawings and particularly to FIG. 1 thereof, there is shown schematically a typical automotive exhaust system generally designated by the numeral 10 which includes a header section 12 and a tail pipe section 14. The tail pipe section 14 may include a catalytic converter and a muffler downstream of the header. The header section 12 and tail pipe section 14 have circumferentially extending radially outwardly directed flanges 20 and 22 including a series of circumferentially spaced aligned bolt holes 20a and 22a for bolt 25 and nut 27 fasteners.

Figure 6:
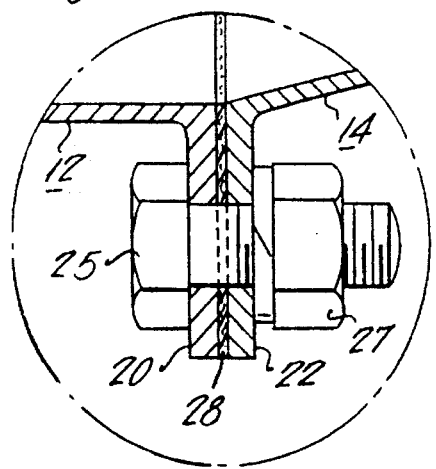
FIG. 6 is a typical prior art seal used for connecting the header and tail pipe sections.

This junction of the two flanges 20 and 22 is sealed by a flat ring like gasket 28 prior to the present invention in the manner illustrated in FIG. 6. This gasket type seal presents disadvantages and draw backs discussed above. These disadvantages may be summarized by the tact that these seals do not withstand the torsion loads and other conditions that tend to cause leakage paths so that the gasket 28 will often fail prematurely creating noise and potential health problems.

The seal of the present invention is characterized by novel features of construction and arrangement facilitating a tight long term seal between the flanges of the sections of the exhaust system described above. The seal of the present invention provides a large effective surface area sealing at the juncture of the flanges.

More specifically, the seal of the present invention comprises two annular sealing members, an inner annular sealing ring like member 40 made of a deformable material, such as non-asbestos fibers admixed with steel wire, and an outer spacer or retainer ring 42 preferably made of steel circumscribing the annular ring member 40 and radially spaced therefrom to define a circumferentially extending gap G. The bore 44 of the outer retainer ring 42 is preferably circular and of a diameter D1 slightly greater than the maximum diameter D of the inner annular ring member 40 in the relaxed state. Further, the inner annular ring member 40 is preferably of a larger axial width W greater than the thickness T of the outer retainer ring 42.

In the present instance, the annular ring member 40 has a generally cylindrical bore 46 and has a contoured outer peripheral surface 48, consisting in the present instance of two circumferentially extending tapered frusto conical outer faces 48a and 48b connected by a short generally cylindrical center section 48c. In this manner, the inner edge 60 defined by the flange 20 of the manifold section 12 and the inner edge 62 of the flange 22 defined by the tail pipe section 14 engage at about the mid point of the opposing tapered frusto conical faces 48a and 48b of the inner annular ring member 40 when the seal is positioned between the flange members 20 and 22 as shown in FIG. 4.

Figure 7:
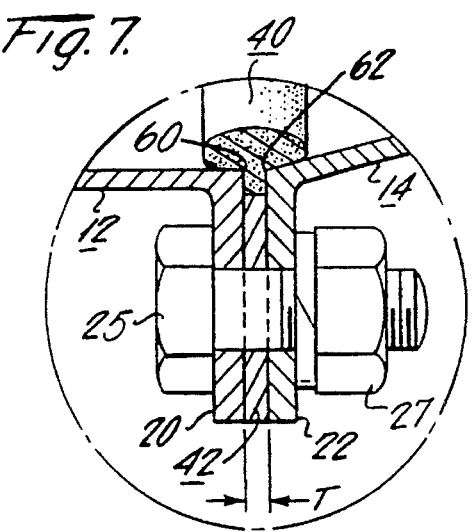
FIG. 7 is an enlarged fragmentary view of the assembled seal shown in the dot and dash circle of FIG. 5.

Thereafter, when the flanges 20 and 22 are drawn together by tightening the bolts 25 to a position where they are spaced apart by the thickness T of the metallic retainer ring 42, the inner edges 60 and 62 press against the opposing tapered faces 48a and 48b to deform the annular ring member 40 so that the seal presses tightly at the junction of the parts in the manner shown in FIG. 7. Note that the material of the annular ring member 40 overlies and presses tightly against the circumferentially extending surfaces adjacent the edges 60 and 62.

The following is an example of a seal in accordance with the present invention for a typical automotive exhaust system wherein the header 12 has an inside diameter D2 of 2.875 inches, as does the portion of tail pipe 14 at flange 22.

| REF. LETTER | DEFINITION | MEASUREMENT |
| --- | --- | --- |
| D | Outer diameter of inner annular sealing ring member 40 | 3.0 inches |
| D1 | Inner diameter of the outer retainer ring member 42 | 3.625 inches |
| D2 | Inside diameter of header section 12 adjacent to exhaust section 14 | 2.875 inches |
| D3 | Pitch circle of bolt fasteners 25 equally spaced from each other as shown on outer retainer ring 42 in FIG. 2 | 3.875 inches |
| D4 | Inner diameter of inner annular sealing ring member 40 | 2.50 inches |
| D5 | Generated outer diameter of outer retainer ring 42 | 4.25 inches |

Of course, different exhaust systems have different sized headers and tail pipes or exhaust pipes, and the seal of the present invention will need to be sized to accommodate those dimensions. Most automobile exhaust systems can be sealed by the present invention using one of about three general sizes.

The installed seal of the present invention provides a large internal seal area that resists the effects of heat and pressure which develop in the exhaust system. Further, the internal back pressure acts on the seal in a manner to expand the sealing surfaces and aids in producing the large seal area, which practically eliminates the escape of noxious exhaust gases and the like.

Even though a particular embodiment of the invention has been illustrated and described herein, it is not intended to limit the invention and changes and modifications maybe be made therein within the scope of the following claims:

What is claimed is:

1. A gasket for use with exhaust systems having at least one header flange and an exhaust pipe flange joined thereto, comprising:

an inner annular sealing ring like member made of a deformable material, an outer annular metal retainer ring sized to be mounted at a flange junction between said header flange and said exhaust pipe flange;

said inner ring having an outside diameter slightly less than the inside diameter of said outer ring and of a radial size to span the inner edge of each of the flanges when concentrically aligned with the axis of the header flange and exhaust pipe flange to deformably support said inner ring on said outer ring, said outer ring inside diameter further being greater than the inner diameter of said flange junction to permit said inner ring to be compressed by said flanges upon forming said junction, said inner ring having an axial width greater than the cross sectional axial width of the outer ring so that said inner ring deforms to support said inner ring and to provide a radial and axial seal at said junction.

2. The gasket of claim 1, wherein said inner ring is formed from an asbestos free fiber fused with spiral wound metal wire.

3. The gasket of claim 2, wherein said an asbestos free fiber is an aramid fiber and said spiral wound metal wire is stainless steel.

4. The gasket of claim 1, wherein the axial thickness of said inner ring is at least twice as thick as the axial thickness of said outer ring.

5. The gasket of claim 1, wherein said inner ring has an inner diameter sufficiently large to avoid restricting flow of exhaust gas through said junction.

6. The gasket of claim 1, wherein said outer ring is provided with annularly spaced holes patterned to align with bolt holes on said flanges.

7. A gasket as claimed in claim 1 wherein the outer diameter of the inner ring is slightly less then the inner diameter of said outer ring.

8. An exhaust system for exhausting combustion gasses, comprising:

at least one exhaust header extending from the source of said gasses, said header having at least one terminal flange;

at least one exhaust pipe having a flange positioned to be joined to said header flange; and an annular metal retainer ring of a predetermined cross sectional axial thickness having an inner peripheral surface mounted between the confronting faces of said header flange and said exhaust pipe flange;

an annular sealing ring member made of a deformable material disposed interiorly of said retainer ring member and having an axial width greater than the cross section of said outer ring and of a radial size to span the inner edge of said flanges when concentrically aligned with the axis of header and pipe so that displacement of said flanges toward one another deforms said sealing ring to sealingly engage the inner peripheral surface of said retainer ring and the peripheral surfaces of said header and exhaust pipe adjacent said flanges.

9. The gasket of claim 8, wherein said inner ring is formed from an asbestos free fiber fused with spiral wound metal wire.

10. The gasket of claim 9, wherein said an asbestos free fiber is an aramid fiber and said spiral wound metal wire is stainless steel.

11. The gasket of claim 8, wherein the axial thickness of said inner ring is at least twice as thick as the axial thickness of said outer ring.

12. The gasket of claim 8, wherein said inner ring has an inner diameter sufficiently large to avoid restricting flow of exhaust gas through said junction.

13. The gasket of claim 8, wherein said outer ring is provided with annularly spaced holes patterned to align with bolt holes on said flanges.

14. A gasket as claimed in claim 8 wherein the outer diameter of the inner ring is slightly less then the inner diameter of said outer ring.

* * * * *

UNITED STATES PATENT AND TRADEMARK OFFICE
CERTIFICATE OF CORRECTION

PATENT NO. : 5,518,280
DATED : May 21, 1996
INVENTOR(S) : Dennis L. Mann

It is certified that error appears in the above-indentified patent and that said Letters Patent is hereby corrected as shown below:

Col. 1, line 3, please insert the title --FIELD OF THE INVENTION--.

Col. 1, line 4, please insert the phrase under the title Field of the Invention --The present invention relates to seals for sealing joints in automotive exhaust systems--.

In colum 2, line 57, please correct the word "tact" to read --fact--.

Signed and Sealed this

Twentieth Day of August, 1996

Attest:

BRUCE LEHMAN

*Attesting Officer*     *Commissioner of Patents and Trademarks*